Figure 1:
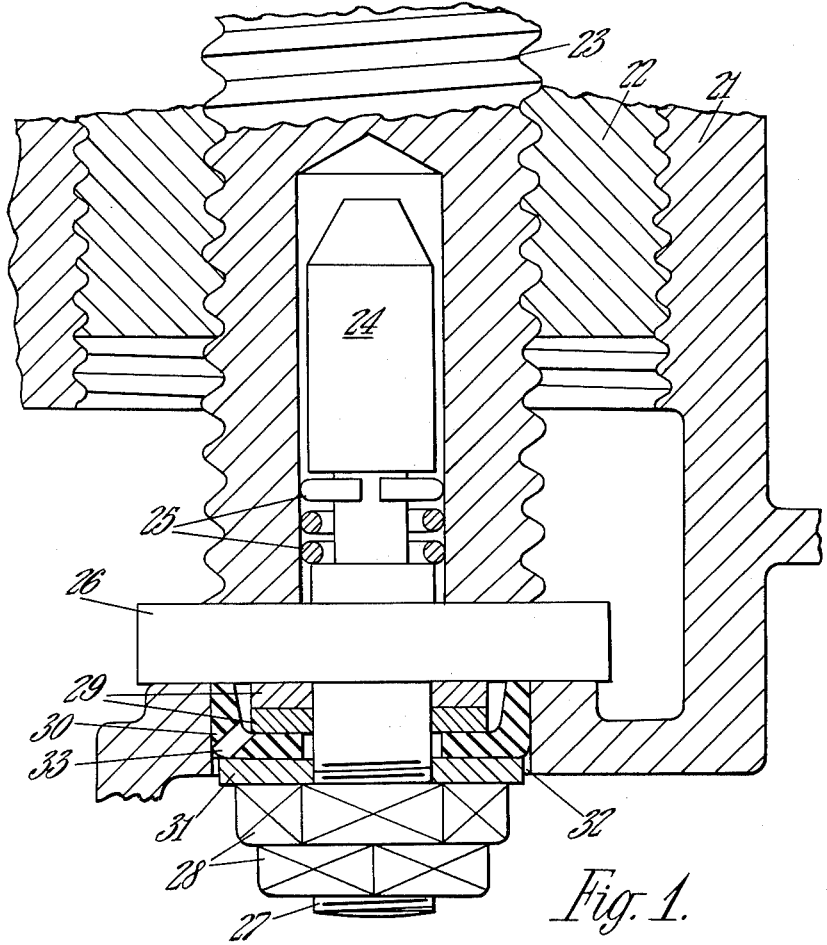

Inventor
A. B. Buckley
By Mascoll Downing Theobold
Attys.

United States Patent Office 3,064,939
Patented Nov. 20, 1962

3,064,939
FLUID FLOW VALVES
Arthur Burton Buckley, Emsworth, England
Filed Aug. 25, 1960, Ser. No. 51,893
Claims priority, application Great Britain Sept. 8, 1959
2 Claims. (Cl. 251—175)

This invention relates to valves for controlling the flow of liquids, especially discharge valves or so-called taps, of the kind having a bore leading to a seating opposed to which is a retractable closure member for the bore supported by an operating spindle, the latter generally being screw-threaded, in the operation of which the closure member is withdrawn from or returned to its seating.

In the past, valves of this kind have generally been furnished with closure members (washers) arranged to be compressed against the seating by thrust applied by the operating spindle: this tends to damage the closure member, which progressively hardens and becomes cut or otherwise deformed.

According to the present invention, a valve of the kind referred to comprises a closure member adapted to enter the bore and seal resiliently against the inner wall thereof by radial pressure between the closure member and the inner wall. Mechanical means may be provided for producing the aforesaid radial pressure, and these mechanical means are preferably adjustable so as to provide an initial adjustment for the size of the aforesaid bore, and a subsequent adjustment for wear.

In the valve according to this invention means may be provided so that radial pressure between the closure member and the inner wall is produced by the pressure of the fluid whose flow is to be controlled. Conveniently, the inner face of the closure member may be in communication with the inlet side of the valve in the closed position so that the closure member is urged by fluid pressure against said inner wall.

The communication between the inner face of the closure member and the inlet side of the valve may be provided by means of a perforation in the closure member or the closure member may be mounted on means which are bored to provide this communication. Conveniently, the closure member is in the form of a tyre engaged about a headed stud on the seating side of a washer plate.

In valves of the kind referred to, it is convenient to mount the aforesaid closure member on means separable from the aforesaid operating spindle, this separable means being called a jumper. It is conventional to provide a swivel connection between the jumper and the spindle, a positive connection being made; the jumper is normally provided with a stem for insertion into a bore in the end of the spindle: thus it has been the practice to introduce a pin into a hole drilled through the spindle so as to engage an annular groove in the stem of the jumper tangentially; it has been more recent practice to form an intrusion of metal into an annular groove in the stem of the jumper by forcing a punch radially into the spindle to a sufficient depth without actually piercing it.

In order to provide frictional means for making a swivel connection between a jumper and its spindle, this invention consists, in another aspect, in a valve of the kind referred to having a bore in the end of the spindle for the insertion of the stem of a jumper, a frictional connection being provided between the wall of the spindle bore and the jumper by means of one or more circlips provided on the jumper stem, the circlips being of a diameter greater than the diameter of the spindle bore. The circlips are conveniently contained in an annular groove in the jumper stem, and the magnitude of the frictional force that the circlips can provide can be varied for any given size of circlip by varying their number.

The circumference of the circlip is provided with a gap of sufficient width to allow of its being forced over the diameter of the neck without exceeding the circlip's elastic limit. The diameter of the wire which constitutes the circlip is substantially less than the width of the space between the diameter of its housing and that of the neck.

Figure 2:
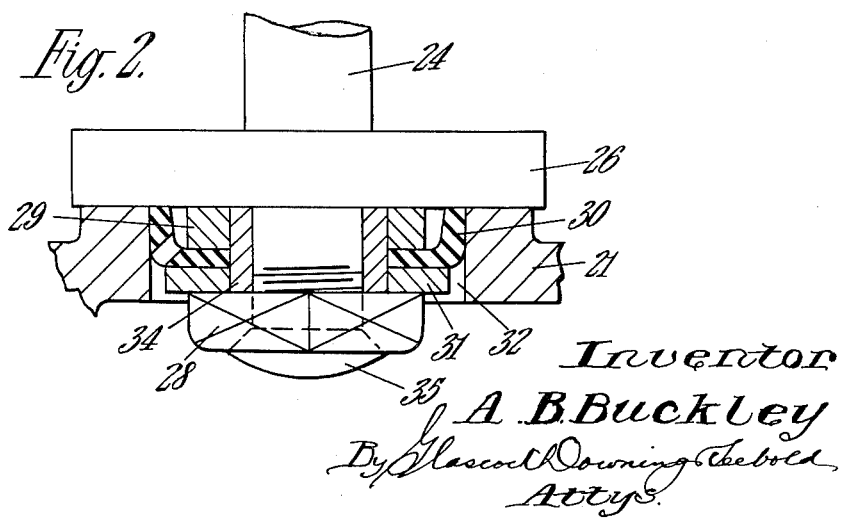
Figure 3:
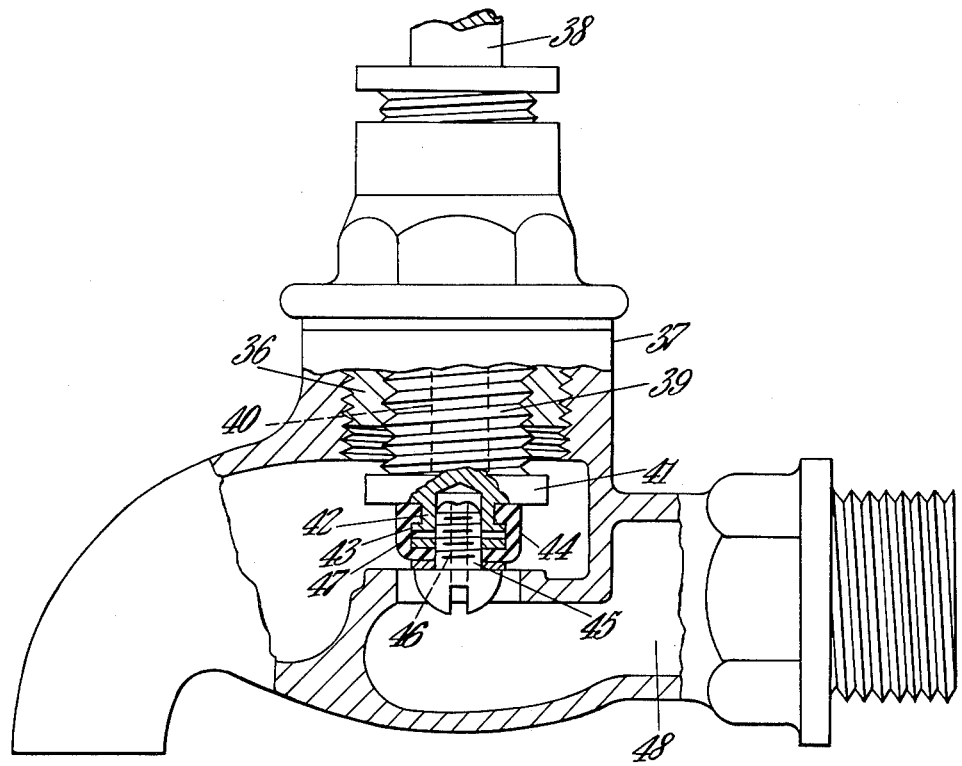

Two constructions of valve according to this invention will be described with reference to the accompanying drawings, of which FIGURE 1 is a side view, partly in cross section of part of one construction, FIGURE 2 shows a modification of the jumper shown in FIGURE 1, and FIGURE 3 is a side view partly in section of another construction.

Referring to FIGURE 1 a valve body 21 is internally threaded to receive a member 22 which in turn, is internally threaded to receive an operating spindle 23. This spindle 23, which is screw threaded for effecting axial advance and retractive movement, is counter-bored to receive the stem 24 of a jumper. The stem 24 has an annular recess in which circlips 25 provide a swivel connection between the spindle 23 and the jumper, and serve to retain the stem 24 in its position within the spindle 23. The jumper further comprises a washer plate 26 and a stem 27, which is an extension of the stem 24 beyond the washer plate 26, the stem 27 having a threaded end on which are mounted two lock-nuts 28: these lock-nuts 28 hold two root washers 29, a slightly conical, cup-shaped, elastic washer 30 and a guard washer 31 in position on the stem 27. It should be noted that the guard washer 31 and the diameter of the adjacent end of the cup-shaped washer are of slightly smaller size than the size of the bore 32 in the lower half of the valve body 1, into which the jumper protrudes, and the cup-shaped washer 30 has a hole at 33 whereby the inner face of the cup-shaped washer 30 is in connection with the valve inlet. The lip of the cup-shaped washer 30 abuts against the washer plate 26 under pressure applied through the guard washer 31 by tightening the lock-nuts 28 against the interposed guard washer and root washers. The amount of said axial pressure depends on the thickness and number of the root washers and its object is to produce radial expansion of the cup-shaped washer so as to create initial sealing pressure between it and the bore 32 when the two are in contact. This provision may be necessary in order to provide an effective seal when the pressure to be sealed is too low to overcome the elastic resistance of the cup-shaped washer. Moreover, wear of the contacting surfaces can be compensated for by reducing the overall thickness of the root washers by various combinations of their number and thickness.

The base of the jumper described in the foregoing paragraph can be modified as shown in FIGURE 2, wherein the washer plate 26, a root washer 29, the cup-shaped washer 30, the guard washer 31, together with a sleeve 34 are all held on the end of the jumper stem 24 by a screw 35 associated with a lock-nut 28, screwing into a threaded bore in the stem 24. The object of this modification is to provide a positive stop, the sleeve 34 against which the screw 25 can be tightened, thus avoiding the somewhat indefinite abutment provided by the compressible base of the cup-shaped washer 30. In this modification, wear of the contacting surfaces of the cup-shaped washer 30 and of the bore 32 can be compensated for by the insertion of different lengths of sleeves 34 and root washers 29.

FIGURE 3 shows a bib tap is in the form of a casting 37 internally threaded to receive a member 36 which in turn is internally threaded to receive an operating spindle 38. The spindle, which is screw threaded at 39 for effecting axial advance and retractive movement, is counterbored to receive the stem 40 of a jumper which also comprises a washer plate 41. On the other side of the washer plate is a stud 42 having an enlarged head 43 about which is mounted a resilient tyre 44 of rubber or rubber like material. This tyre is secured in position by a headed screw 45 screwed into the stud 42 which is correspondingly counter-bored. An axial bore 46 is formed in the screw 45 and a diametrical bore 47 is formed across the head 43 so that the inner face of the tyre 44 is in communication with liquid coming from the inlet portion 48 of the tap by way of the natural clearance existing between the male and female portions of the respective screw thread.

The tyre, may if desired, have a built up construction, comprising a cup shaped member for fitting over the head 43 and a compressible ring fitting into the annular groove between head 43 and plate 41.

In operation of the construction of FIGURE 1 the smaller end of the tapered cup-shaped washer enters the bore and the effect of the said initial sealing pressure is augmented by the pressure of the fluid admitted through hole 33. Where fluid pressure is high the alternative described in the second construction mentioned in this specification, where fluid is admitted by way of the natural clearance between screw threads, is preferred because of the obstruction which such conditions of flow offer to flow through the cup-shaped washer while it is entering the bore.

I claim:

1. A fluid control valve comprising a housing having an inlet port for fluid under pressure, an outlet port for the fluid and an intermediate wall across the housing, said wall having a smooth non-tapering cylindrical bore therethrough forming a valve chamber through which the fluid may flow and having a flat surface about the exit of the bore, a stem member movable axially of the bore and having a radially outwardly extending annular flange of greater diameter than the bore for seating engagement against the flat surface of the wall, a hollow cup-shaped elastically deformable washer having a cylindrical outer non-tapering wall of a diameter substantially that of the bore, said washer having an open upper end and a radially inwardly extending bottom wall, rigid annular means extending substantially across the outer surface of the bottom wall of the washer, spacer means within the cup-shaped washer extending between the flange and the inner surface of the bottom wall of the washer, axially adjustable means on the stem member abutting the rigid means to maintain the washer with its open end in sealing engagement against the flange and the bottom wall of the washer against the spacer means, the spacer means having a smaller periphery than the inner wall of the washer to provide a hollow space therewithin, means on the housing for moving the stem member axially toward the exit of the bore against the force of the fluid pressure to position the washer within the bore with the bottom wall exposed to the fluid under pressure, and an opening through the wall of the washer exposed to the pressure of the fluid and leading into the hollow washer for radially expanding it directly by the fluid under pressure against the wall of the bore when the flange is seated against the intermediate wall.

2. A fluid control valve comprising a housing having an inlet port for fluid under pressure, an outlet port for the fluid and an intermediate wall across the housing, said wall having a smooth non-tapering cylindrical bore therethrough forming a valve chamber through which the fluid may flow and having a flat surface about the exit of the bore, a stem movable axially of the bore and having a radially outwardly extending annular flange of greater diameter than the bore for seating engagement against the flat surface of the wall, a cup-shaped elastically deformable washer having a cylindrical outer non-tapering wall of a diameter substantially that of the bore surrounding a portion of the stem, said washer having an open end seated against the flange with its radially inwardly extending bottom wall against one end of the stem, rigid annular means extending substantially across the outer surface of the bottom wall of the washer, said portion of the stem having an axially extending screw-threaded opening, and a screw-threaded member extending into the screw-threaded opening from said other end in abutting relation with the rigid means to maintain the open end of the washer in sealing engagement against the flange and the bottom wall of the washer against the other end of the stem member, said portion of the stem having a substantially diametric opening extending from the threaded opening to the inner wall of the cup-shaped washer, means mounted on the housing for moving the stem axially toward the exit of the bore against the fluid pressure to position the washer within the bore with the screw-threaded member exposed to the force of the fluid pressure, said axial and diametric openings in the portion of the stem forming a passageway for the fluid pressure to radially expand the washer when the flange is seated against the intermediate wall.

References Cited in the file of this patent

UNITED STATES PATENTS

| 123,584 | Shriver | Feb. 13, 1872 |
| 612,890 | Wood | Oct. 25, 1898 |
| 2,352,249 | Briggs | June 27, 1944 |
| 2,770,443 | Rand | Nov. 13, 1956 |
| 2,886,283 | Natho | May 12, 1959 |
| 2,953,345 | Slemmons | Sept. 20, 1960 |

FOREIGN PATENTS

| 11,915 | Great Britain | Aug. 17, 1888 |
| 431,474 | Germany | July 12, 1926 |
| 454,546 | Great Britain | Oct. 2, 1936 |
| 545,281 | France | July 18, 1922 |